United States Patent [19]

Burton et al.

[11] Patent Number: 4,957,331
[45] Date of Patent: Sep. 18, 1990

[54] HYDRAULIC ANTI-SKID VEHICLE BRAKING SYSTEM

[75] Inventors: Robert T. Burton, Leamington Spa; Phillip A. Taft, Solihull, both of Great Britain

[73] Assignee: Lucas Industries Public Limited Company, Brimingham, England

[21] Appl. No.: 366,363

[22] Filed: Jun. 15, 1989

Related U.S. Application Data

[63] Continuation of Ser. No. 210,858, Jun. 24, 1988, abandoned.

[30] Foreign Application Priority Data

Jun. 27, 1987 [GB] United Kingdom ............... 8715129

[51] Int. Cl.⁵ .......................... B60T 8/58; B60T 8/46
[52] U.S. Cl. .................................. 303/115; 303/113; 303/116
[58] Field of Search ................ 303/3, 20, 61, 62, 63, 303/84.2, 92, 100, 110, 113, 114, 115, 119; 188/151 A, 181 A, 182; 60/545, 582, 591

[56] References Cited

U.S. PATENT DOCUMENTS

| 3,549,210 | 12/1970 | Birge et al. | 303/115 |
| 3,614,176 | 10/1971 | Holst et al. | 303/61 |
| 3,663,068 | 5/1972 | Sharp | 303/113 |
| 3,674,317 | 7/1972 | Mangold | 303/92 |
| 3,874,745 | 4/1975 | Peruglia et al. | 303/115 |
| 3,877,758 | 4/1975 | Kuwana | 303/115 |
| 3,942,843 | 3/1976 | Tobiasz | 303/115 |
| 4,056,286 | 11/1977 | Burkett | 303/3 X |
| 4,083,609 | 4/1978 | Cochran | 303/113 X |
| 4,653,815 | 3/1987 | Agarwal et al. | 303/113 X |
| 4,691,813 | 9/1987 | Dittner et al. | 303/115 X |
| 4,715,665 | 12/1987 | Ostwald | 303/61 X |
| 4,835,695 | 5/1989 | Walenty et al. | 303/115 X |
| 4,838,622 | 6/1989 | Kircher et al. | 303/115 |

FOREIGN PATENT DOCUMENTS

| 0297797 | 1/1989 | European Pat. Off. | 303/115 |
| 1916662 | 4/1969 | Fed. Rep. of Germany | 303/113 |
| 3322422 | 1/1985 | Fed. Rep. of Germany | 303/115 |
| 0088651 | 4/1987 | Japan | 303/113 |
| 2047366 | 11/1980 | United Kingdom | 303/115 |
| 2188111 | 9/1987 | United Kingdom | 303/113 |

*Primary Examiner*—Robert P. Olszewski
*Assistant Examiner*—Matthew C. Graham
*Attorney, Agent, or Firm*—Fleit, Jacobson, Cohn, Price, Holman & Stern

[57] ABSTRACT

In an hydraulic anti-skid braking system (FIG. 1), a valve controlling the flow of braking fluid to a brake actuator is actuated by a pulse-driven stepper motor in response to signals emanating from a skid sensor. In a practical arrangement (FIG. 3), a motor under the control of a microprocessor actuates a pressure dump valve via an eccentric mechanism upon the appearance of a skid signal at the sensor, in order to de-pressurize the actuator, and also drives a pump which assists in re-pressurizing the system when the skid signal ceases.

11 Claims, 3 Drawing Sheets

HYDRAULIC ANTI-SKID VEHICLE BRAKING SYSTEM

This is a continuation of application Ser. NO. 210,858, filed June 24, 1988, which in turn is now abandoned.

BACKGROUND OF THE INVENTION

This invention relates to an hydraulic vehicle braking system of the general type including a primary pressure source operable to apply braking pressure to a wheel brake actuator, sensing means arranged to sense an incipient wheel skid condition of the wheel during running of the vehicle, and a modulator device influenced in response to a signal from the sensing means to modify the braking pressure in the brake actuator and thereby the braking force applied to the wheel, in order to correct the wheel skid condition.

Some known systems of this general type employ solenoid valves to modulate fluid flow from wheel-driven pumps in order to release and re-apply the brakes in an anti-skid mode. Although such systems can be generally satisfactory in a service, they have the disadvantage of being electrically and mechanically complex and can be insufficiently sensitive to cope with extremes of operation.

BRIEF SUMMARY OF THE INVENTION

According to the present invention, there is provided an hydraulic vehicle braking system of the aforesaid general type, in which the modulator device is actuated by a stepper motor in response to signals emanating from the wheel skid-sensing means.

In this invention, the stepper motor also actuates a cut-off valve to isolate the primary source from the brake actuator during said skid condition.

Conveniently, the variation of said braking pressure is controlled by varying the speed of the stepper motor.

The brake actuator may be connected to an auxiliary chamber of which the volume may be varied by operation of the stepper motor, the stepper motor being conveniently arranged to actuate a piston in the chamber to produce said variation in volume. Typically, the piston is arranged so that its movement actuates the cut-off valve.

In an alternative arrangement, the stepper motor drives a pump which re-pressurizes the brake actuator to restore braking after correction of an incipient skid condition. In this arrangement, the actuation of the cut-off valve is effected by reverse rotation of the stepper motor.

BRIEF DESCRIPTION OF THE DRAWINGS

The invention will now be described, by way of example, with reference to the accompanying drawings wherein.

DETAILED DESCRIPTION

Figure 1:
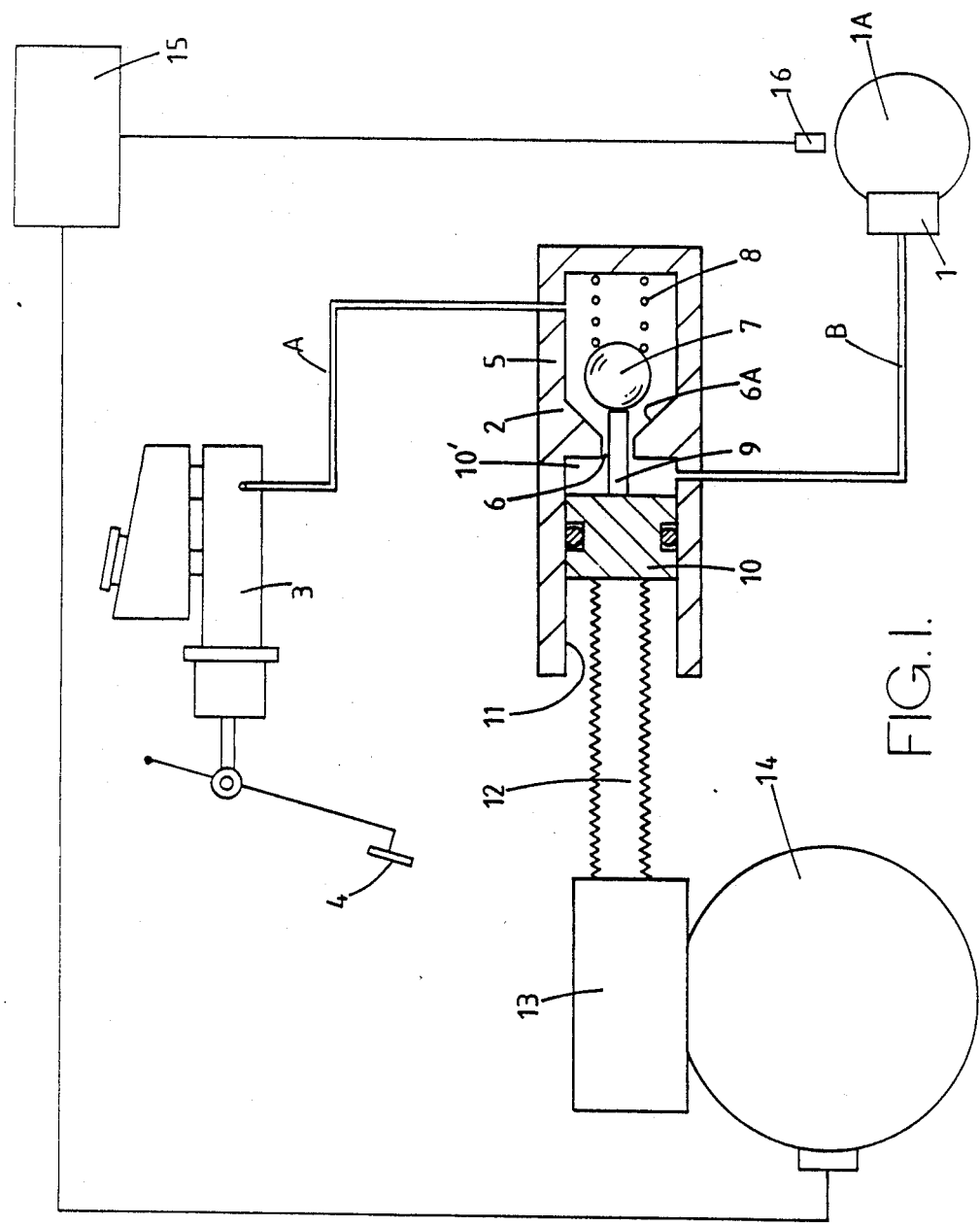
FIG. 1 is a diagrammatic representation of a first embodiment of the braking system of the invention in the form of an anti-skid system.

The braking system illustrated in FIG. 1 includes a brake 1 associated with a wheel 1A to be braked and supplied through conduits A, B via a control valve 2 from a primary fluid pressure source in the form of a master cylinder 3 actuated by a pedal 4. The valve 2 includes a body 5 having an internal port 6 through which communication is normally established between the brake 1 and master cylinder 3. The port is surrounded by a seat 6A towards which a valve member 7, illustrated as a ball, is urged by a spring 8. The ball is normally held away from the seat 6A, against the action of the spring 8, by a stem 9 projecting axially from a piston 10 slidable within a cylindrical bore 11 of the body. A chamber 10' is formed at the side of the piston nearest to the valve member, the volume of the chamber being variable by movement of the piston 10 along the bore 11, for the purpose to be described. A threaded shaft 12 projects axially from the other side of the piston and is connected to a drive mechanism 13 from which the shaft is driven in rotation from a pulsed input stepper motor 14, which may conveniently be of the switched reluctance type. The motor operates under the control of a micro-processor 15 in response to signals emanating from a wheel speed sensor 16 located adjacent the wheel 1A.

Normal braking is performed with the valve components in their positions shown, so that the port 6 is open and the master cylinder 3 is in communication with the brake 1 via the conduits A and B. Depression of the pedal 4 actuates the master cylinder to supply fluid under pressure through the valve 2 and into the brake 1. In the event that the sensor 16 senses an incipient skid condition, an output signal is produced by the sensor which triggers the micro-processor 15 to cause the motor 14 to rotate in a direction such as to rotate the threaded shaft 12 by way of the drive mechanism 13 to move the piston 10 to the left, as seen in the drawing. This enables the spring 8 to move the ball 7 into engagement with the seat 6A, thereby closing the port 6 and interrupting communication between the master cylinder 3 and the brake 1. Said leftward movement of the piston increases the volume of the chamber 10' which causes pressure to be dumped from the brake 1 connected to the chamber. During continuation of the skid condition, the motor 14 operates to move the piston 10 further to the left, resulting in a further increase in the volume of the chamber 10' and consequent pressure reduction in the brake actuator until a cessation of the skid condition is sensed by the sensor 16. When this happens, the micro-processor 15 causes the motor 14 to reverse and return the piston 10 towards its original position, which results in a decrease in volume of the chamber 10' and re-application of pressure to the brake 1, following which the ball 7 is dislodged once more from the seat 6A to re-establish communication between the master cylinder 3 and the brake and thereby permit resumption of normal braking.

The stepper motor is sensitive to frequencies in the KHz range and is therefore subject to extremely fine control by the micro-processor, enabling the motor to respond with great sensitivity to signals from the sensor 16.

Figure 2:
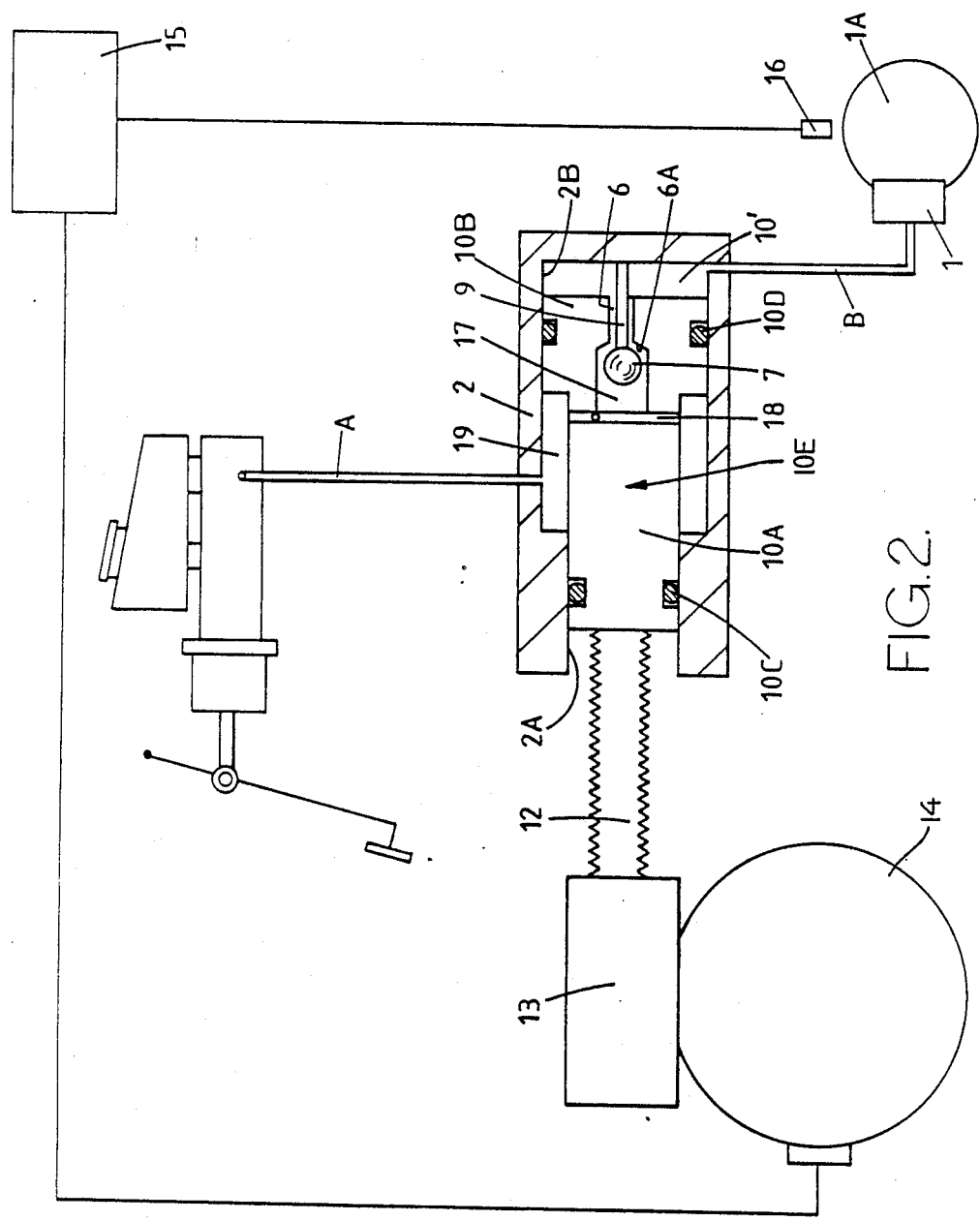
FIG. 2 is a modified version of the system of FIG. 1.

The system shown in FIG. 2 is similar to that of FIG. 1 but includes a modification to ensure that, in the event that the motor 14 were to fail with the valve member 7 in its closed position, the brake 1 could continue to be operated by actuation of the master cylinder. For this purpose, the body 2C is stepped to provide bore portions 2A, 2B, within which slide smaller and larger diameter parts 10A, 10B of a piston element 10E, the piston parts carrying respective seals 10C, 10D engaging the internal surfaces of the corresponding bore portions in fluid tight manner. In this embodiment, the valve element 7 is carried within a chamber 17 of the larger diameter piston part 10B, the chamber 17 communicating via a radial passage 18 with a space 19 formed between the smaller diameter piston part 10A and the internal wall of the bore 2B. The flow port 6 and valve seat 6A are formed, in this embodiment, by the large diameter piston part 10B and the valve member 7 is carried by a stem 9 projecting from the end wall of the body 2C, the length of the stem being such that the valve member is normally held clear of the seat 6A until the piston 10 is moved by the stepper motor in the manner to be described.

Normal braking is effected with the components in their positions shown, fluid under pressure from the master cylinder 3 being supplied via conduit A, the space 19, radial passage 18, chamber 17, port 6, and conduit B to the brake 1.

When an incipient skid condition is sensed by the wheel sensor 16, the micro-processor 15 actuates the motor 14, which rotates the shaft 12 via the drive mechanism 13 in a direction such as to move the piston 10E to the left, as seen in the drawing. This brings the seat 6A into engagement with the valve member 7 to close off the port 6, thereby interrupting communication between the master cylinder 3 and brake 1. Such leftward movement of the piston also increases the volume of the chamber 10' between the piston 10B and the end of the cylinder, thereby reducing pressure in the brake as described in connection with FIG. 1. In the event that the motor fails when the valve is in its closed position, the differential pressure from the master cylinder acting on the larger diameter piston portion 10B will force the piston 10 to the right to re-open the valve and restore communication between the master cylinder and brake to enable the brakes to be reapplied. For this action to be possible, either the threaded connection between the shaft 12 and drive mechanism 13 must be reversible or some other means must be provided, in order to permit the necessary axial movement of the piston for brake re-application.

Figure 3:
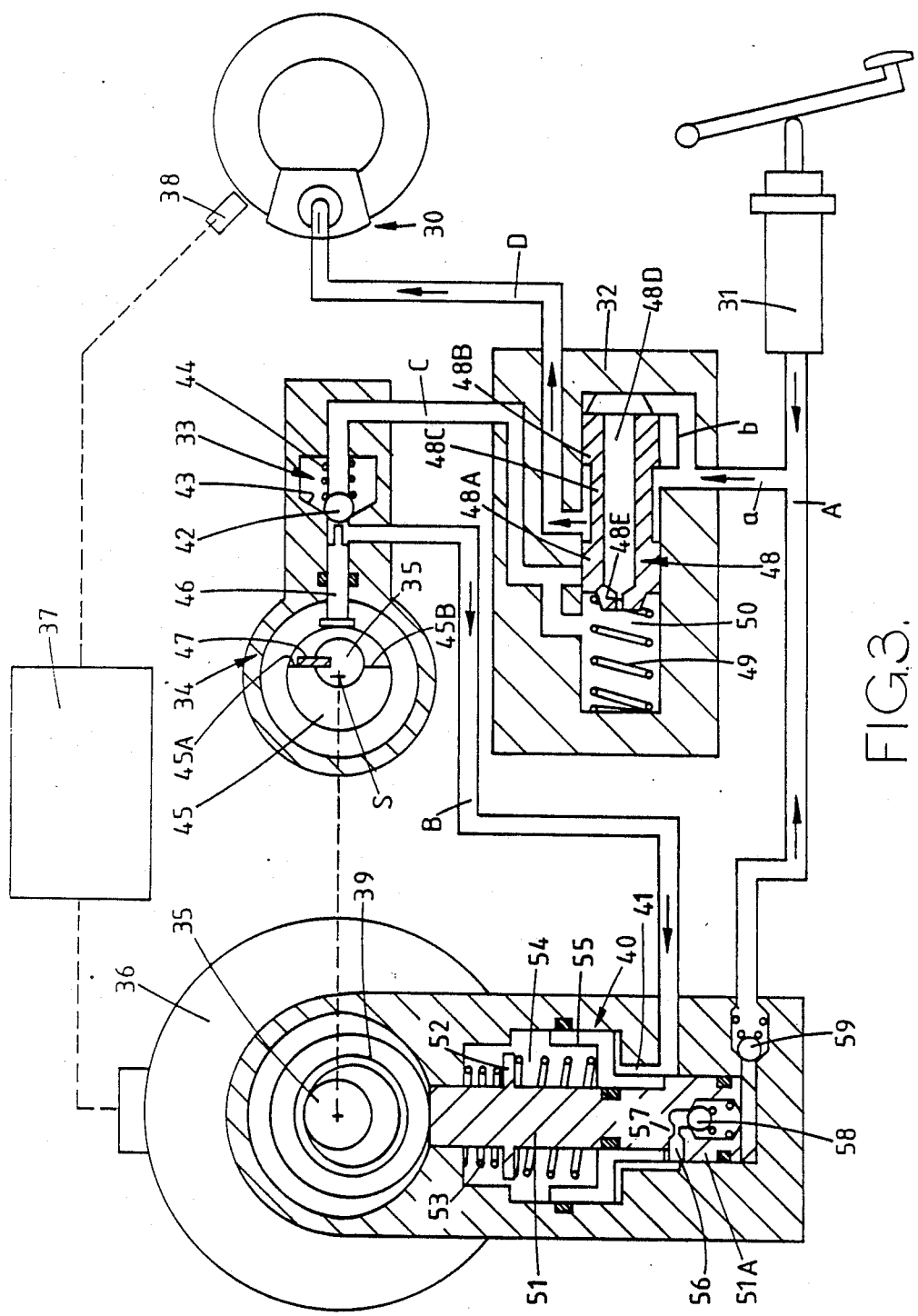
FIG. 3 is a schematic drawing of a further embodiment of a practical arrangement of an anti-skid braking system of the invention.

FIG. 3 illustrates diagrammatically a possible practical embodiment of an anti-skid system of the invention in which a brake 30 is actuated by a master cylinder 31 by way of a spool valve 32 which operates under the influence of a control valve 33. The latter is actuated by a control mechanism 34 connected to a shaft 35 driven by a stepper motor 36 which is preferably a switched reluctance motor. The shaft 35 is shown in two parts, for ease of illustration. The motor 36 operates under the control of a controller in the form of a micro processor 37, into which are fed signals derived from a wheel-mounted skid sensor 38 of conventional type. The shaft 35 is arranged to drive an eccentrically mounted cam 39 which operates a pump mechanism 40 in the manner to be described. A conduit A connects the master cylinder 31 to the pump mechanism 40 and provides a branch "a" into the valve 32. A conduit B extends between the left hand side of the valve mechanism 33 and an input chamber 41 of the pump mechanism 40. A conduit C connects the right hand side of the valve mechanism 33 to the spool valve 32 and a conduit D connects the valve 32 to the brake 30.

The valve mechanism 33 includes a valve member in the form of a ball 42 urged against a valve seat 43 by a spring 44. The control mechanism 34 includes a cam element 45 mounted on the shaft 35 and bearing against one end of a thrust member 46, the other end of which lies adjacent the valve element 42. The shaft 35 is arranged eccentrically relative to the element 45 and has a drive tongue 47 which abuts one or the other of a pair of drive surfaces 45A, 45B of the element 45, depending upon the direction of rotation of the shaft. With the tongue 47 in engagement with the face 45A, the shaft and element 45 can perform a true rotational movement in a counter-clockwise direction as a single unit about the shaft center S and the outer surface of the element 45 then rubs against the adjacent end of the transmission member 46 without producing translational movement of the latter. When the motor 36 is reversed to drive the shaft 35 in the opposite direction, the tongue 47 engages the face 45B and the center of rotation of the element 45 effectively moves to the right so that its rotation becomes eccentric. When this happens, the transmission element 46 is urged to the right to displace the ball 42 from its seat, for the purpose to be described.

The spool valve 32 contains a spool 48 which is normally held in its illustrated position by a spring 49 housed in a pressure chamber 50 of the valve. The spool 48 has a pair of lands 48A, 48B, between which there is a reduced diameter annulus 48C. A central axial passage 48D is formed through the spool, communicating at one end with a spur "b" of the branch conduit "a" and at its other end with the chamber 50 via a restricted orifice 48E.

The pump mechanism 40 includes a plunger 51 having a radial flange 52 against one side of which is engaged a return spring 53 which urges the plunger in a direction away from the cam 39 so that the plunger is normally disengaged from the cam or in only light rubbing contact therewith. A further spring 54 acts between the flange 52 and an expander piston 55 surrounding the plunger in fluid-tight relationship, the underside of the piston 55 being subject to pressure exerted by fluid from the conduit B entering the chamber 41.

A larger diameter portion 51A of the piston 51 has a radial port 56 opening into the chamber 41 and having a flow control orifice 57. The port 56 is normally prevented from communicating with the conduit A by oppositely acting non-return ball valves 58 and 59 housed respectively in the piston part 51A and the pump body.

Braking under normal conditions is performed by actuating the master cylinder 31 to expel fluid under pressure into the conduit A, the remote end of which is, at this stage, closed by the ball valve 59. Fluid flows from the conduit A along the conduit "a" and around the reduced diameter annulus 48C of the spool 48 into the conduit D and thence to the brake 30. Fluid is also supplied via the branch "b" into the passage 48D of the spool, whence it flows through the restricted orifice 48E into the chamber 50. Pressure is thus equalized at either side of the spool, which therefore remains in its illustrated position under the action of the spring 49. Provided that no skid signal is produced by the sensor 38, the stepper motor 36 rotates the shaft 35 in a counter-clockwise direction, so that no eccentric action is applied by the cam element 45 to the thrust member 46.

The valve 42 therefore remains closed, preventing communication between conduits C and B and enabling pressure to be established in the brake, in the usual manner. During this time, the plunger 51 of the pump 40 will be spaced from or in only light rubbing contact with the pump eccentric 39 under the action of the spring 53, so that the pump is in idling condition and no pumping action will occur.

When an incipient skid condition is sensed by the sensor 38, a signal is transmitted from the sensor to the micro-processor 37 which causes the motor 36 to reverse and rotate in a clockwise direction. The resulting clockwise rotation of the shaft 35 brings the tongue 47 into engagement with the face 45B of the element 45, producing eccentric clockwise rotation of the element 45 which moves the member 46 to the right and dislodges the ball 42 from its seat. The conduit C is now connected to the conduit B, which has the effect of relieving the pressure in the chamber 50 and increasing the pressure in the chamber 41. The pressure drop in the chamber 50 creates a pressure differential across the spool 48 which enables the master cylinder pressure to move the spool to the left so that the land 48B moves across the ends of the conduit D and branch "a" so as to isolate the brake from the master cylinder. Simultaneously, the reduced diameter annulus 48C moves to a position in which it bridges and interconnects the conduits C and D, thereby dumping pressure from the brake actuator 30. The brake pressure is now applied via the conduits B, C and D to the chamber 41 and acts to move the expander piston 55 upwardly so as to apply upward pressure via the spring 54 to the plunger 51 and thereby engage the latter against the pump eccentric 39. This action causes a further substantial dumping of pressure from the actuator 30 by increasing the volume of the chamber 41 connected to the actuator. The plunger 51 now reciprocates under the action of the eccentric, drawing fluid from the chamber 50 and expelling it via the one-way valves 58 and 59 into the conduit A, whence the pumped fluid circulates via the spool valve, conduits C and B and the pump. Pressure is thereby maintained in the circuit ready for re-application of the brake, when required.

When the sensor 38 indicates that the skid condition has been corrected, the micro-processor 37 acts to reverse the direction of rotation of the motor 36, bringing the tongue 47 back into engagement with the face 45A of the eccentric element 45, so that concentric rotation of the element 45 about center S is re-established, enabling the spring 44 to return the ball 42 to its closed position. When this occurs, pressure is built up again in the chamber 50, urging the spool 48 to the right and thereby enabling the pumped pressure fluid to be rapidly re-applied via the conduits A, "a" and D to the brake, supplementing the action of the master cylinder 31 which is also reconnected to the brake via the same path. Closure of the valve 33 interrupts the supply of pressure to the pump expander piston 55, enabling the plunger 51 to return to its inoperative condition relative to the cam eccentric 39. The flow control orifice 57 ensures that the pump 40 cannot deliver more fluid than it is receiving from the remainder of the system, so that no untoward back pressure is applied to the master cylinder 31. The action of brake release and re-application will take place many times per second during the existence of an incipient skid condition so as to avoid locking of the braked wheel.

The system of the invention is particularly advantageous in that the stepper motor rotational speed is subject to very fine control by the action of the microprocessor 37, enabling the brake pressure dump and re-apply rates to be varied very rapidly and sensitively for the purpose of skid control. The micro-processor can be used to monitor a given anti-skid cycle of brake release/brake re-apply and to store relevant information such as the pressure dump time and subsequent duration of pressure re-application to reach the skid point once more. The micro-processor can then use this information for the adaptive control of subsequent anti-skid cycles so as to improve the braking effect and bring it towards the ideal in which as little actual braking effort as possible is lost during an anti-skid operation. This is possible because the motor speed and direction can be changed very rapidly to respond to the requirements of the system.

In a modification of the system of FIG. 3, the eccentric control mechanism 34 may be replaced by an arrangement in which the valve actuating member 46 is operated from the motor 36 through a one-way clutch or skew gear drive. When a skew-gear drive is employed, the driven gear acts as the valve actuating member. Other details of the system of FIG. 3, such as the valves and pump may be modified in any convenient manner, whilst retaining the essential principle of the invention.

It will be understood that the switched reluctance motor described may be replaced, in any embodiment of the invention, by any appropriate form of reversible stepper motor system which is susceptible to digital control.

Although the invention has been described in relation to various forms of anti-skid braking system, it will be understood that the invention can equally well be applied to the correction of wheel spin, i.e. wheel skid under acceleration, as distinct from wheel skid which occurs under deceleration. As will be understood by those familiar with the art, it would be necessary to arrange for the master cylinder to be isolated from the brake during an anti-skid mode of operation and the microprocessor would respond to excessive rather than insufficient wheel speed and operate the system to apply the brake temporarily in order to correct the sensed wheel-skid condition. A suitable modification could be made to the FIG. 1 arrangement, for example, by providing an additional port and surrounding seat at the opposite side of the ball 7 to the seat 6A, arranged so that movement of the piston 10 to the right to pressurize the brake actuator 1 for the purpose of correcting a wheel-skid condition would move the ball to the right to close the additional port so as to isolate the brake actuator from the master cylinder 3. The stem 9 would require to be spring-loaded and movable relative to the piston to permit the necessary additional rightward movement of the piston, with the additional port closed, which would be required in order to generate braking pressure in the actuator.

We claim:

1. A hydraulic vehicle anti-skid braking system comprising:
   a wheel brake actuator means;
   a primary fluid pressure source;
   fluid pressure conduit means connecting said primary fluid pressure source to said brake actuator means for operating said brake actuator means by fluid pressure from said fluid pressure source;

skid sensing means for detecting an incipient skid condition of the wheel and emitting a signal in response thereto during running of the wheel;

modulator means operatively connected in said conduit means for controlling the application of fluid pressure from said fluid pressure source to said actuator, said modulator means comprising, a modulator housing, a cylinder in said housing having a larger diameter section and a smaller diameter section, a piston operatively mounted in said cylinder for reciprocating movement, said piston having a larger diameter section and a smaller diameter section corresponding to said larger and smaller diameter sections of said cylinder, respectively, a first variable volume chamber defined between one side of said piston and said cylinder, a part of said conduit means being connected between said first variable volume chamber and said brake actuator means, a second chamber connected to said source of fluid pressure by another part of said conduit means and defined between a fixed end wall and cylindrical wall of said cylinder and the other side of said piston spaced from said fixed end wall, said piston having a first area subject to fluid pressure in said first chamber and a second area subject to fluid pressure in said second chamber, valve means operatively disposed between said fluid pressure source and said brake actuator means, and valve operating means responsive to operation of said stepper motor for operating said valve means between an open position and a closed position;

a stepper motor operatively connected to said sensing means for receiving said signal therefrom for operating said stepper motor thereby; and a reversible screw thread mechanism operatively connected to said stepper motor for operation by rotation of said stepper motor, and operatively connected to said piston for reciprocating said piston to vary the volumes in said chambers so that movement of said piston outwardly of said first chamber increases the volume of said first chamber and thereby relieves fluid pressure on said brake actuating means, said stepper motor operates to return said piston to a normal operating position when no skid-condition is detected by said skid sensing means, and in the event of failure of said stepper motor when said valve means is in said closed position said piston is permitted by said reversible thread to move by pressure on said second area to open said valve means.

2. An anti-skid braking system as claimed in claim 1 wherein:

means are provided for varying the speed of said stepper motor; and the speed of operation of said modulator is controlled by varying the speed of said stepper motor for varying the application of fluid pressure to said brake actuator means.

3. An anti-skid braking system as claimed in claim 1 wherein said valve means comprises:

further conduit means connecting said first chamber to said second chamber for fluid flow therebetween;

a valve seat in said further conduit means; and ball valve means in a part of said further conduit means and engageable with said valve seat in said closed position for preventing flow of pressure fluid through said further conduit means.

4. An anti-skid braking system as claimed in claim 3 wherein said valve operating means comprises:

a valve supporting stem having one end of which said ball valve is mounted; and said valve operating means producing relative movement between said ball valve and said valve seat.

5. An anti-skid system as claimed in claim 4 wherein:

said further conduit is in said piston;

said valve supporting stem is mounted on said modulator housing and extends through a part of said further conduit means and through said valve seat and supports said ball valve in a predetermined position with respect to said housing so that operation of said stepper motor by said skid sensing means upon detection of a skid condition moves said piston into said closed position of said valve means.

6. An anti-skid braking system as claimed in claim 5 wherein:

said further conduit means comprises a substantially axially extending fluid passage and a substantially radially extending fluid passage.

7. An hydraulic vehicle anti-skid braking system comprising:

a wheel brake actuator means;

a primary fluid pressure source;

fluid pressure conduit means connecting said primary fluid pressure source to said brake actuator means for operating said brake actuator means by fluid pressure from said fluid pressure source;

skid sensing means for detecting an incipient skid condition of the wheel and emitting a signal in response thereto during running of the wheel;

modulator means operatively connected in said conduit means for controlling the application of fluid pressure from said fluid pressure source to said actuator, said modulator means comprising, valve means in said fluid pressure conduit means for controlling flow of pressure fluid from said source of pressure fluid to said brake actuator means, cylinder means, piston means operatively mounted in said cylinder means for reciprocating movement, and an expandable volume chamber defined between said piston means and cylinder means, a part of said conduit means connecting said chamber to said valve means and being normally closed by said valve means;

a stepper motor operatively connected to said sensing means for receiving said signal therefrom for operating said stepper motor thereby;

valve operating means operatively connecting said stepper motor to said valve means so that rotation of said stepper motor in first direction maintains said valve means in an open position to allow fluid flow through said valve means and conduit means for normal operation of said brake actuator means, and rotation of said stepper motor in the reverse direction in response to detection of a skid condition by said skid sensing means actuates said valve means to cut-off fluid pressure from said fluid pressure source to said actuator means and open said part of said conduit means to said expandable chamber to relieve fluid pressure on said brake actuator means; and pump means operatively connected to said stepper motor for operation thereby and operatively connected to said fluid pressure conduit means so that said stepper motor operates said pump means to re-pressurize said brake actuator means to restore brake pressure after said skid condition is no longer detected by said skid sensing means.

8. An anti-skid braking system as claimed in claim 7 wherein:

said expandable chamber is in said pump means;

said valve means comprises a spool valve between said fluid pressure source and said brake actuator means having a normally open position, and normally closed ball valve means connected by said conduit means to said spool valve, pump means, and through said chamber to said fluid pressure source; and said valve operating means comprises a thrust member engageable with said ball valve means for moving said ball valve means to an open position for controlling via said conduit means fluid pressure in said spool valve to move said spool valve to a closed position, and relieve fluid pressure on said brake actuator means by expansion of said expandable chamber.

9. An anti-skid braking system as claimed in claim 8 wherein said pump means further comprises:

a cylinder;

a movable pump piston in said cylinder, said expandable chamber being defined by one side of said pump piston and said cylinder;

a second pump chamber defined by the other side of said pump piston and said cylinder;

a pump plunger mounted on said pump piston for movement thereby and extending through said second chamber;

cam means operatively connected to said stepper motor for operation thereby;

an outer end on said pump plunger engageable with said cam means; and re-pressurizing means adjacent the other end of said pump plunger and operatively associated with said pump chamber and said conduit means, so that upon detection of a skid condition fluid pressure fed to said pump chamber through a part of said conduit means from said ball valve means in the open position moves said pump piston to expand said pump chamber and engage said one end of said pump plunger with said cam means, and rotation of said stepper motor in the reverse direction actuates said pump plunger to repressurize part of said conduit means for applying pressurized fluid to said brake actuator means when said skid condition is no longer detected.

10. An anti-skid braking system as claimed in claim 9 wherein:

said spool valve comprises a spool member; and spring means is provided for resiliently urging said spool member towards said normally open position so that fluid pressure from said fluid pressure source is applied to said brake actuator means when said skid condition is no longer detected.

11. An anti-skid braking system as claimed in claim 10 wherein said spool valve further comprises:

a leakage passage through said spool member interconnecting said spool valve chambers at opposite ends of said spool member, one of said spool valve chambers being connected to said fluid pressure source, so that in said normally open position said spool member is balanced by opposing fluid pressure on said opposite ends of said spool member;

the other spool valve chamber being connected to said ball valve means so that upon opening of said ball valve means a differential pressure is applied to said opposite ends of said spool member to move said spool member to the closed position thereof isolating said fluid pressure source from said brake actuating means.

* * * * *